United States Patent [19]
Luscombe

[11] 3,907,139
[45] Sept. 23, 1975

[54] STACK FORMING DEVICE
[76] Inventor: Gene A. Luscombe, R.R. 1, Dolliver, Iowa 50531
[22] Filed: Oct. 7, 1974
[21] Appl. No.: 512,679

Related U.S. Application Data
[63] Continuation-in-part of Ser. No. 353,699, April 23, 1973, Pat. No. 3,840,134.

[52] U.S. Cl. .............. 214/518; 214/509; 214/83.24; 100/215; 193/3
[51] Int. Cl.² ................................ B60P 1/32
[58] Field of Search .......... 214/501, 505, 508, 509, 214/83.36, 83.3, 518, 520, 521, 522, 83.24, 83.28; 100/210, 215; 193/3, 14; 302/60, 61; 56/347, 344, 345

[56] References Cited
UNITED STATES PATENTS
3,552,801  11/1968  Gilbreth .................. 100/215 X
3,556,327   1/1971  Garrison .................... 214/522

*Primary Examiner*—Albert J. Makay
*Attorney, Agent, or Firm*—Williamson, Bains & Moore

[57] ABSTRACT

A tow-type haystack forming vehicle includes a vehicle body having ground-engaging wheels and adapted to receive a chopped forage crop such as hay from a crop harvesting device or a crop pickup device. A compaction roller and guide structure are positioned within the vehicle body and the roller is continuously moved in a front and rear direction along the surface of the forage crop to compact the crop during the stack forming operation. A telescopic tubular distributor mechanism is connected to the discharge spout of the forage harvester or crop pickup device and is operable to evenly distribute the crop in the vehicle body. The bottom wall of the vehicle body is shiftable from a forward position to a rearward position rearwardly of the vehicle body whereby the formed stack supported on the bottom wall will be discharged upon the ground when the rear doors for the vehicle body are closed and the bottom wall is then shifted to the forward position.

7 Claims, 9 Drawing Figures

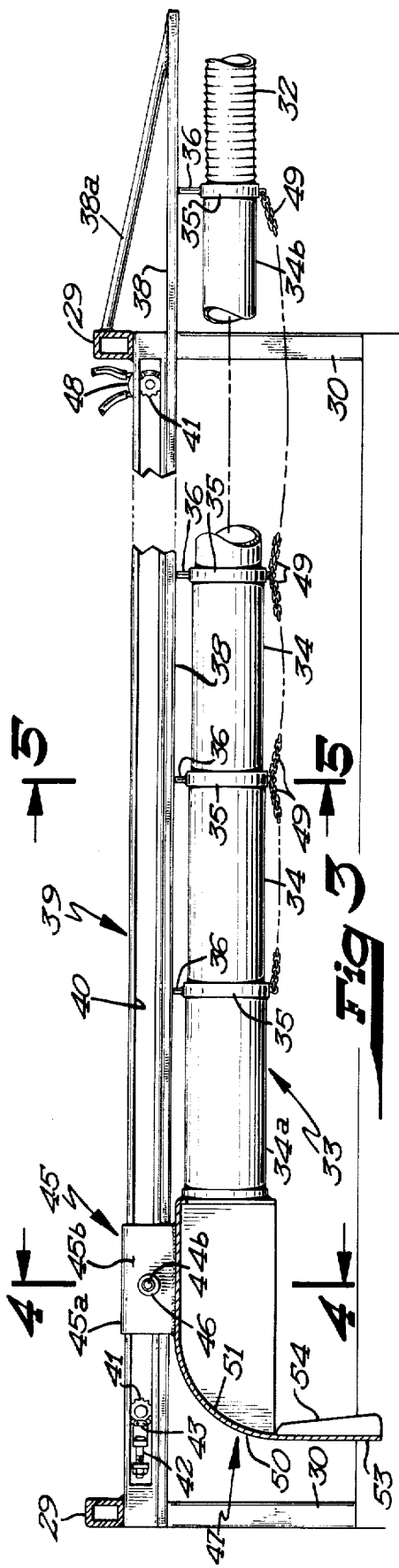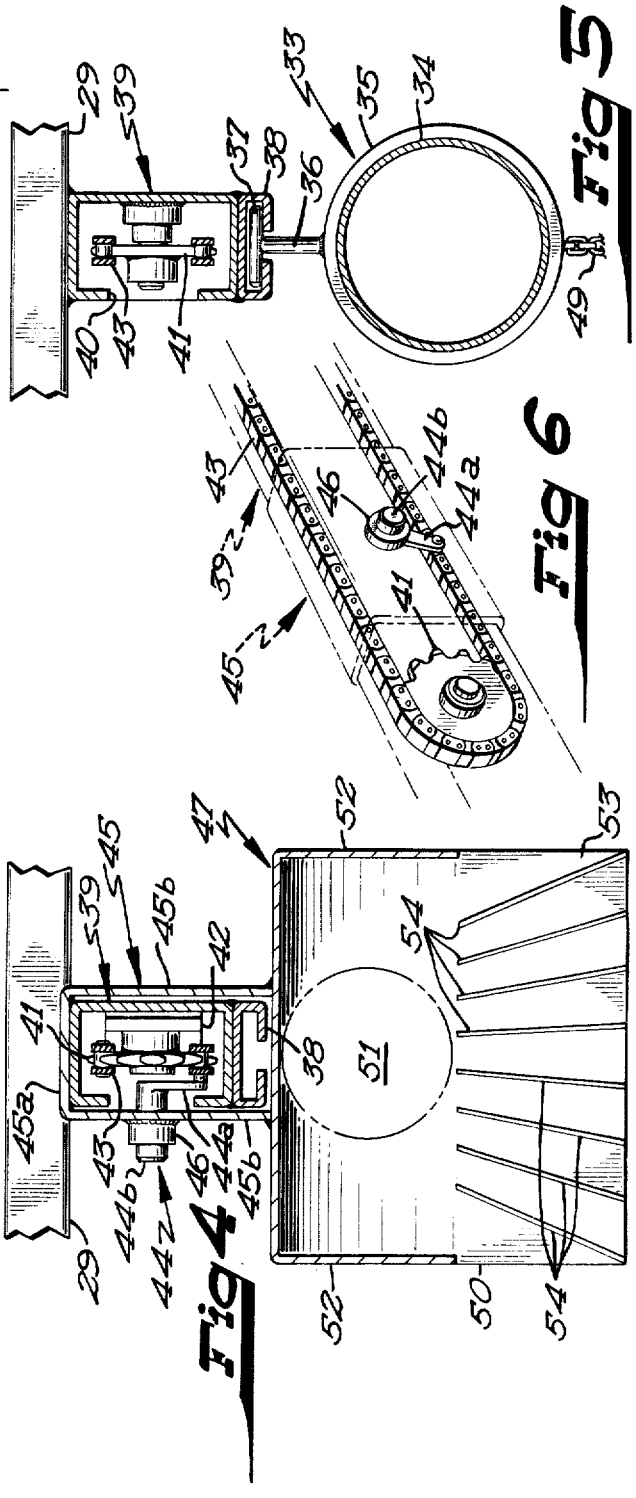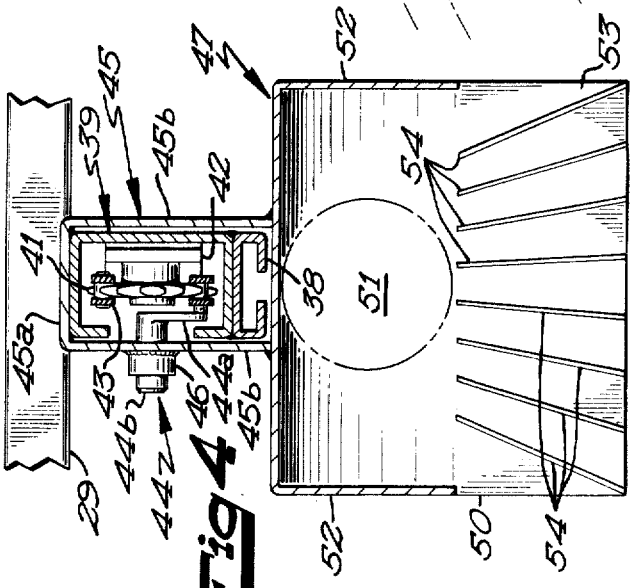

३,९०७,१३९

STACK FORMING DEVICE

This application is a continuation-in-part application of my copending application Ser. No. 353,699, filed Apr. 23, 1973, now U.S. Pat. No. 3,840,134, entitled "Haystack Wagon."

SUMMARY OF THE INVENTION

This invention relates to a stack-forming vehicle which is specifically adapted to form a forage crop, such as chopped hay, into a stable compact stack.

It is an object of this invention to provide a tow-type stack-forming vehicle having a compaction roller mechanism for compacting the forage crop as it is loaded into the vehicle body, and also having a telescopic distributor mechanism which evenly distributes the chopped forage crop into the vehicle body.

Another object of this invention is to provide the novel stack-forming vehicle with a bottom wall shiftable from a front floor-defining position to a rearward position rearwardly of the vehicle body, whereby when the rear door structure of the vehicle body is closed and the floor is retracted forwardly, the formed stack will be discharged upon the surface of the ground.

It is also an object of this invention to provide the stack-forming vehicle with means for maintaining the guide structure of the compaction roller mechanism in a level condition during the stack-forming operation. A brake mechanism is also provided for retaining the roller compaction mechanism in an elevated position when the stack is unloaded.

These and other objects and advantages of this invention will more fully appear from the following description made in connection with the accompanying drawings wherein like reference characters refer to the same or similar parts throughout the several views.

FIGURES OF THE DRAWINGS

FIG. 3 is a side elevational view of the distributor mechanism foreshortened for clarity;

FIG. 4 is a cross-sectional view taken approximately along line 4—4 of FIG. 3 and looking in the direction of the arrows;

FIG. 5 is a cross-sectional view taken approximately along line 5—5 of FIG. 3 and looking in the direction of the arrows;

FIG. 6 is a fragmentary perspective view of a portion of the distributor mechanism illustrating details of construction thereof;

DESCRIPTION OF THE PREFERRED EMBODIMENTS OF THE INVENTION

Figure 1:
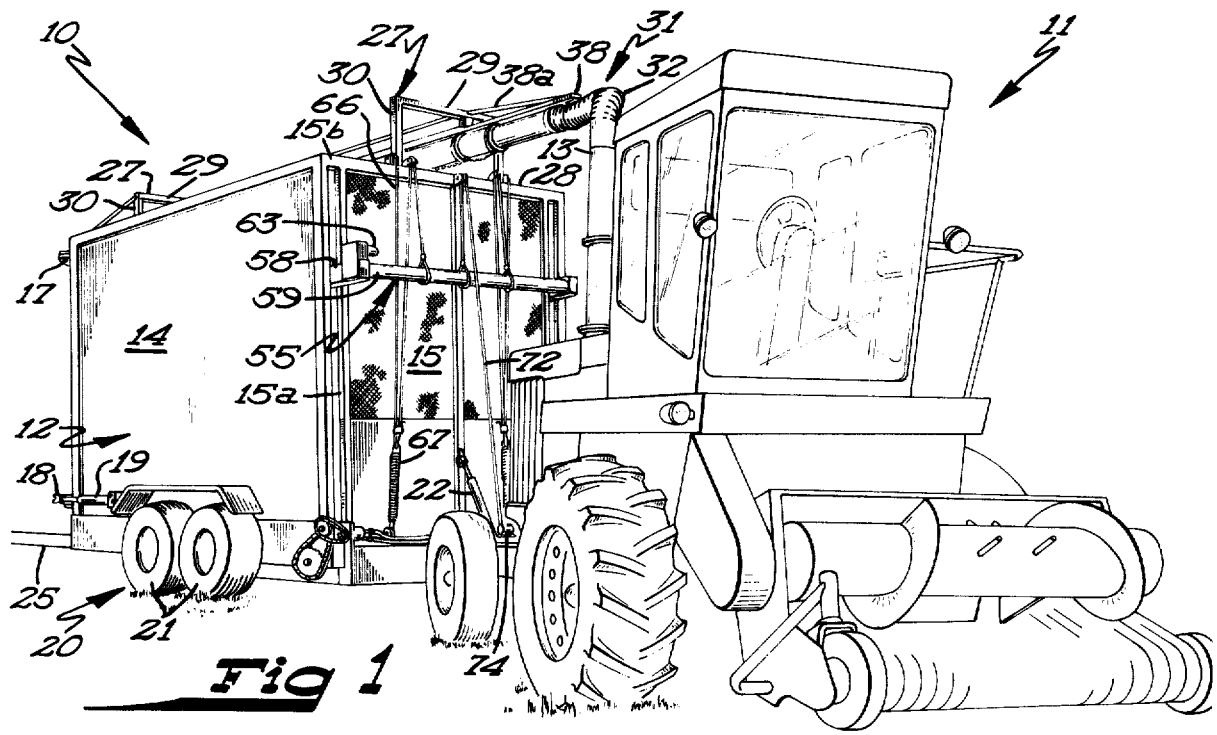
FIG. 1 is a front perspective view of my novel stack-forming vehicle illustrated in connected and towed relation with a conventional self-propelled forage harvester implement.

Referring now to the drawings and more specifically to FIG. 1, it will be seen that one embodiment of my novel stack-forming vehicle or stack wagon, designated generally by the reference numeral 10, is there shown. It will also be seen that my stack-forming vehicle 10 is illustrated in connected and towed relation with respect to a self-propelled conventional forage harvester machine 11, which is of the type for chopping the forage crop, such as hay into relatively small pieces. The forage harvesting machine 11 is provided with a pickup head for picking up windrowed crops, such as hay; and it is pointed out that the stack forming vehicle 10 may also be used with a conventional pickup device which impels the forage crop into the stack-forming vehicle during the stack forming operation. It will be noted that the forage harvesting machine 11 has a discharge tube 13 which projects vertically and through which the forage crop is impelled.

The stack-forming vehicle 10 includes a vehicle body or wagon box 12, including vertically disposed substantially parallel side walls 14, a vertically disposed front wall 15, and a rear door or closure structure 16. In the embodiment shown, the vehicle body does not have a groove or top wall. The front wall is preferably of perforated construction and includes vertical frame members 15a and upper and lower transverse frame members 15b to which the perforated or mesh material is secured.

The rear door structure 16 includes a pair of substantially identical generally rectangular shaped rear doors 16a, each being hingedly connected to one of the side walls 14 by means of hinges 17. Each door has a bracket 18 affixed thereto and projecting outwardly therefrom. A pair of doubleacting hydraulic cylinder units 19 are provided, each being mounted on one of the side walls 14 and each being pivotally connected to one of the brackets 18. With this arrangement, the retraction of the hydraulic cylinder units 19 will shift the doors to an open position and extension of the hydraulic cylinder units will close the doors.

Figure 8:
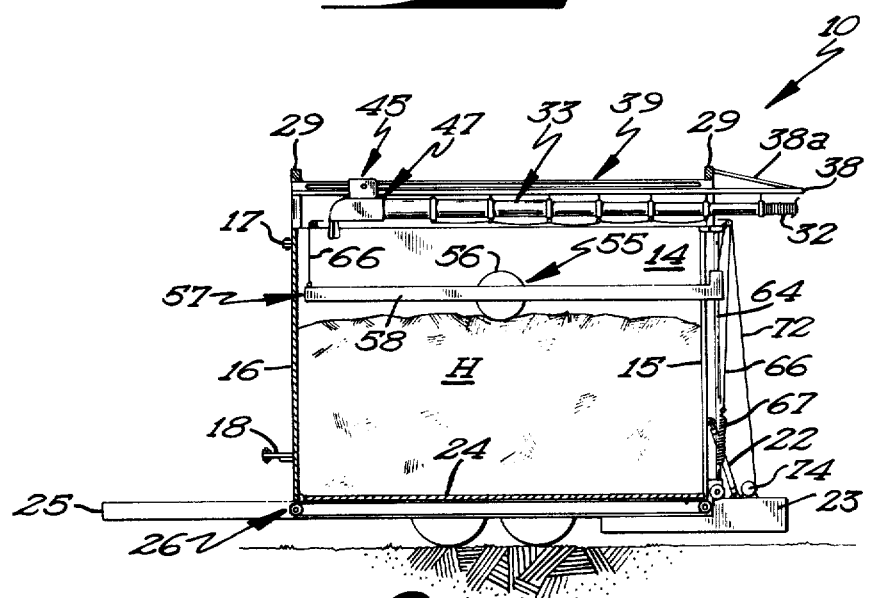
FIG. 8 is a longitudinal sectional view of the stack-forming vehicle, illustrating the interior of the vehicle during the stack forming operation.
Figure 9:
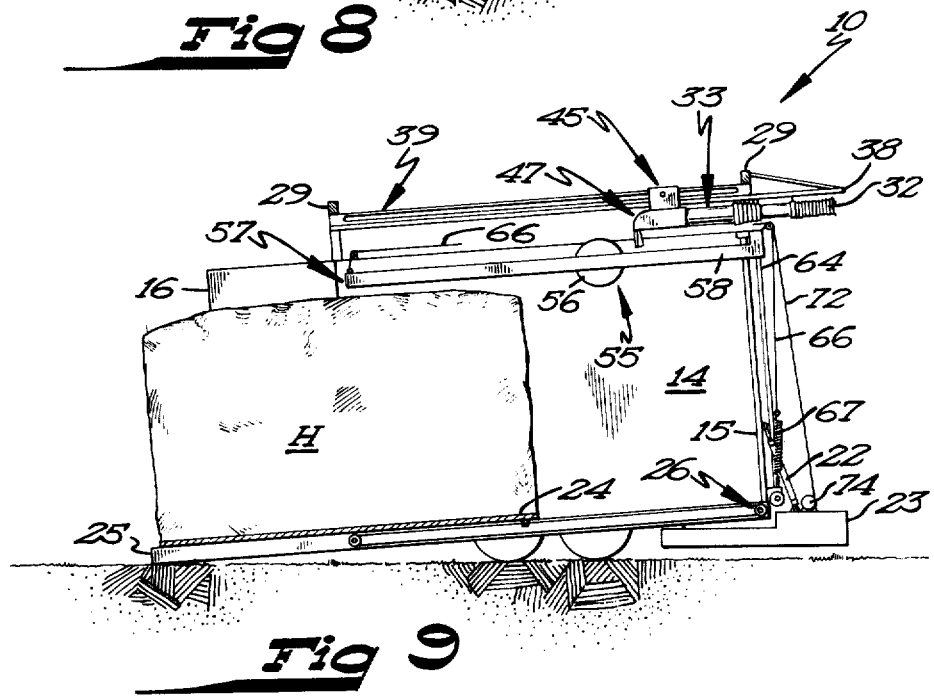
FIG. 9 is a longitudinal sectional view of the stack-forming vehicle similar to FIG. 8, but illustrating the vehicle in a tilted condition with the bottom wall shifted partially rearwardly during the stack unloading operation.

The vehicle body is also supported for travel over the surface of the ground by means of ground engaging wheel assemblies 20, each being comprised of a pair of tandemly arranged ground engaging wheels 21. However, it is pointed out that each wheel assembly may include a single ground engaging wheel if desired. The stack forming vehicle 10 which is adapted to pivot or tilt about the wheel axles between a horizontal position as illustrated in FIG. 8 and a rearwardly inclined position as illustrated in FIG. 9. The vehicle is tilted rearwardly during the stack unloading operation. The means for accomplishing the tilting comprises a pair of double-acting hydraulic cylinder units 22 which are mounted on the hitch 23 and which are connected to the vehicle body 12 adjacent the perspective sides thereof. In this respect, the vehicle body is pivotally connected to the hitch rearwardly of the front wall of the vehicle body as shown in my copending application Ser. No. 353,699, and disclosure thereof is incorporated by reference with respect to the instant application.

The vehicle body also includes a bottom wall 24 which is shiftable between a forward floor defining position and a rearward position located rearwardly of the vehicle during the stack unloading operation. The bottom wall 24 is provided with suitable rollers adjacent its longitudinal edge portions which are positioned in elongate longitudinally extending guides or tracks 25, each of which extends along the lower edge portions of each side wall 14. The bottom wall is provided with a power shifting mechanism 26 for shifting the wall between the forward and rearward positions, and this means includes a pair of longitudinally spaced apart sprockets 26a positioned in each track 25. The sprockets 26a for each track have an endless chain 26b trained thereover, the bottom wall 24 being connected at its front end to each of the chains 26b. It will be noted that the tracks 25 project rearwardly of the vehicle body and the rearmost sprocket 26a for each track is positioned adjacent the rear end of its associated track and rearwardly of the rear doors 16a. The forwardmost sprocket for each track is located at the forward end of each track 25 and these forward sprockets are driven by a hydraulic motor 26c. It will be seen that when the hydraulic motor 26c is driven in one direction, the bottom wall will be moved rearwardly, but when the motor is reversed, the bottom wall will then be retracted to its forward position.

As pointed out above, the present embodiment of the vehicle body does not have a top wall or roof, but means are provided for supporting a distributor mechanism 31 at the upper portion of the vehicle body. This support means includes front and rear inverted U-shaped frames 27, the front frame being rigidly secured to the upper transverse frame member 15b of the front wall and the rear U-shaped member being rigidly mounted on the rear transverse frame member 28 which extends between the side walls 14. Each U-shaped frame includes a transverse member 29 having a pair of legs 30 depending therefrom.

The distributor mechanism 31 includes an elongate flexible coupling 32 which is connected at its front end to the discharge spout or tube of the forage harvesting machine 11 and connected at its rear end to a telescoping tubular distributor structure 33.

The tubular distributor structure 33 includes a plurality of tubular cylindrical sections 34 which are connected together to permit the entire tubular distributor structure 33 to be extended and retracted by a telescoping action. In this respect, each successive tubular section 34 increases in size in a rearward direction, the forwardmost tubular section 34a having the smallest diameter and the rearmost tubular section 34b having the largest diameter. Each tubular cylindrical section 34 is provided with an annular ring fixedly connected to its exterior surface adjacent its front end, each ring having a vertical post 36 projecting upwardly therefrom, as best seen in FIG. 5. The upper end of each post 36 is provided with a horizontal track-engaging element 37 which is positioned within an elongate generally channel-shaped track or guide 38. It will be noted that the track 38 extends forwardly of the vehicle body 12.

The elongate track 38 is rigidly affixed to the lower surface of an elongate, generally rectangular shaped housing or support member 39 which is affixed to the U-shaped frames 27. The housing 39 has an elongate slot 40 in one side thereof, the slot extending substantially through the length of the housing. Means are provided for extending or retracting the distributor structure 33, and this means includes a sprocket chain drive comprised of front and rear sprockets 41, journaled in the housing 39 at opposite ends thereof. The rear sprocket is provided with a chain tightener 42 which adjusts the tension on the endless chain 43 trained about the sprockets 41.

The chain has an attachment element 44 secured to one link thereof, the attachment element including an elongate portion 44a, and having a shift 44b rigidly affixed thereto and projecting laterally therefrom. The shaft 44b is journaled in a suitable bearing 46 in a generally rectangular shaped carriage 45. The carriage 45 includes an upper wall 45a and opposed side walls 45b, the latter being rigidly secured to a deflector 47 which in turn is rigidly secured to the rear end of the rear tubular section 34b. It will be noted that the carriage 45 is positioned exteriorly of and engages the housing 39 and is slidable therealong.

The shaft 44 projects exteriorly through the slot 40 in the housing and engages in the bearing 46 of the carriage 45. The front sprocket 41 is driven by a hydraulic motor 48, the motor being driven in one direction to continuously extend and retract the tubular distributor structure 33. A cable 49 is secured to the annular ring 35 of each tubular section 34.

The distributor mechanism 31 is operated continuously during the stack forming operation, and it will be noted that when the motor 48 is driven, the chain will be moved by the sprocket and will thereby move the carriage 45 longitudinally along the housing 39. It will also be noted that when the carriage 45 is being moved in a rearward direction by the lower run of the chain 43, the deflector and rearmost tubular section 34b will be moved rearwardly by movement of the carriage 45. The cable connection between each adjacent tubular section causes the remaining sections to be pulled rearwardly by the rearmost tubular section 34b. When the carriage has been moved to its rearmost point of travel, the chain will continue to move about the rearmost sprocket which in turn causes the attachment element 44 to be moved with its associated chain link about the rear sprocket 41. The attachment element and associated shaft 44a will pivot in the bearing 46 in the carriage as it travels about the sprocket 41 and the carriage 45 will reverse its direction of travel and will be moved by the upper run of the chain 43 in a forward direction. The rearmost tubular section 34b will be moved in a forward direction, and the annular ring 35 on the rear tubular section 34b will strike the ring of the next adjacent section, since these annular rings 35 on the tubular sections are arranged in confronting relation with respect to each other. Therefore, each annular ring will be moved into engaging relation with each adjacent ring and will therefore cause the tubular section to be collapsed or telescoped inwardly as the carriage is moved in a forward direction. The movement of the attachment element in the bearing of the carriage will permit reversal of travel of the carriage at each end of the housing 39. The deflector 47 which is attached to the rear tabular section 34b is comprised of a curved central wall 50 which is curved downwardly and rearwardly to present a curved concave deflector surface 51 at its lower and forward face. The deflector also includes substantially flat side plates 52 which are secured to the longitudinal edges of the generally rectangular curved central wall 50 and project downwardly therefrom. It will also be noted that the curved central wall projects downwardly beyond the side plates to define a lower portion 53. This lower portion is provided with a plurality of deflector veins which are laterally spaced apart and which diverge in a downward direction. With this arrangement, the chopped hay material will be deflected downwardly by the deflector and distributed evenly in a longitudinal direction by movement of the tubular distributor. The hay will also be evenly distributed in a lateral direction by the distributor veins 54. It will therefore be seen that extension and retraction of the tubular distributor in cooperation with the distributor veins permits even distribution of the chopped forage crop on both longitudinal and lateral directions.

Figure 2:
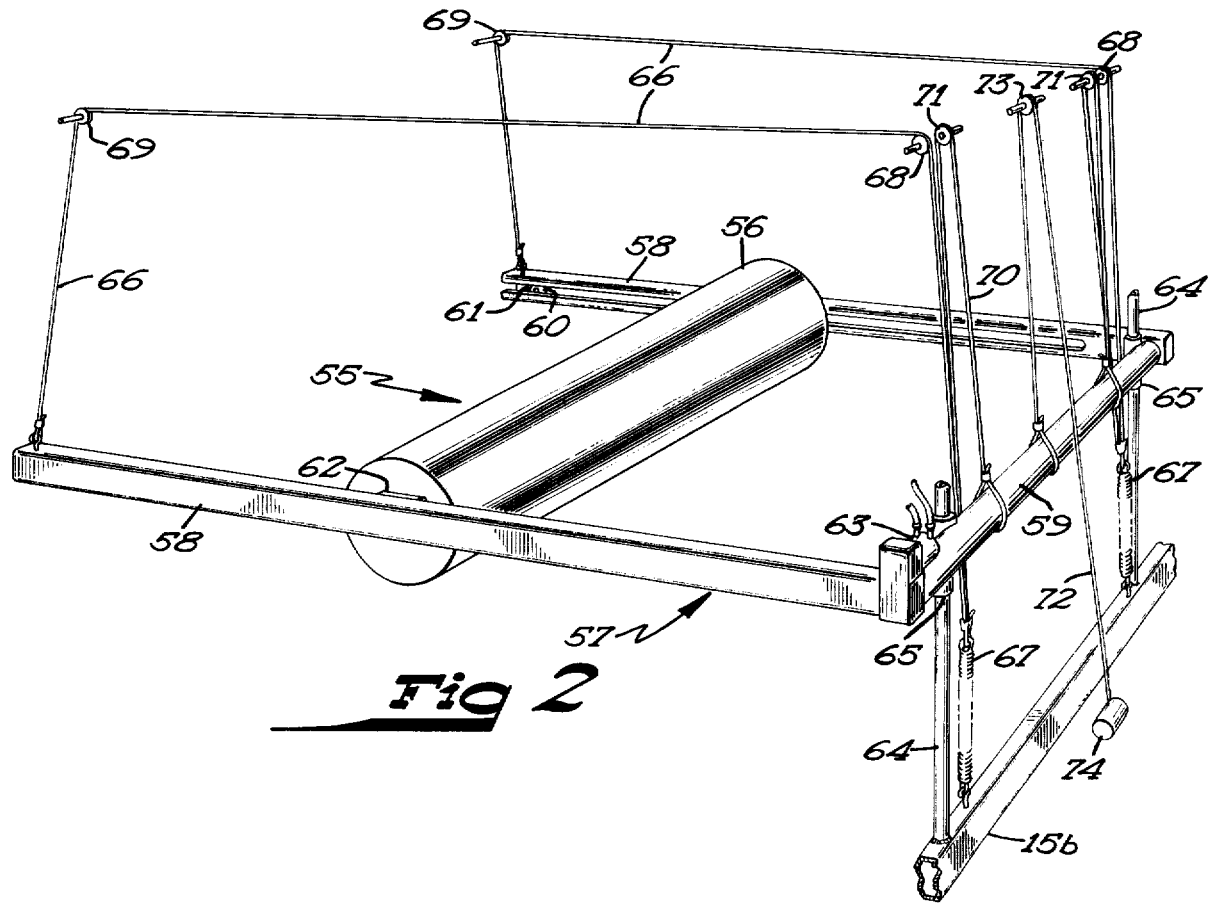
FIG. 2 is a diagrammatic perspective view of the roller compaction mechanism.
Figure 7:
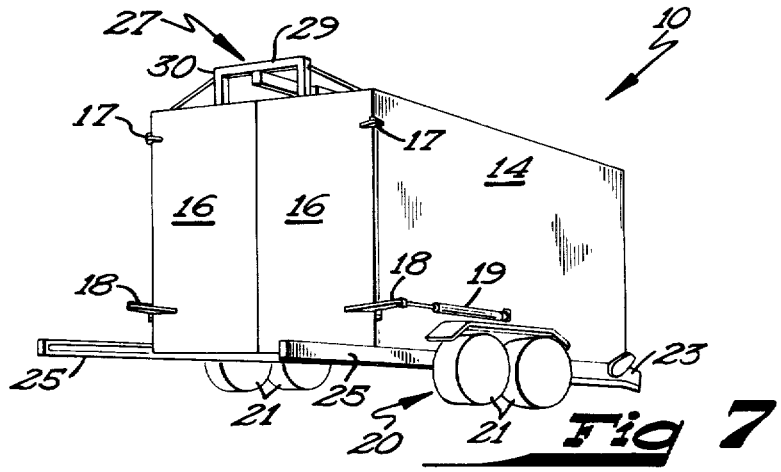
FIG. 7, is a rear perspective view of the stack-forming vehicle.

Means are also provided for compacting the chopped hay during the stack forming operation and this means includes a compaction mechanism 55 which is diagrammatically illustrated in FIG. 2. The compaction mechanism 55 includes an elongate cylindrical compaction roller 56 which is of a size and weight to compact the chopped hay or other forage crop as the crop is introduced into the vehicle body. The compaction roller 56 is arranged transversely of the vehicle and has a length dimension which is only slightly less than the transverse interior dimension of the vehicle body. The compaction roller 56 is rolled in a front and rear direction continuously during the stack forming operation and the roller is guided during this reciprocating movement by a generally U-shaped guide structure 57. The guide structure 57 includes a pair of generally channel-shaped tracks 58 which are rigidly interconnected together at their forwardmost ends by a rigid transverse member 59 positioned exteriorly of the front wall 15. The tracks 58 project through elongate vertical openings in the front wall of the vehicle body. The tracks 58 extend longitudinally of the vehicle body and have a length dimension approximating the interior length dimension of the vehicle body. The roller 56 is provided with an axle having track engaging elements at opposite ends thereof which is positioned within the tracks 58. Each track also has a pair of sprockets 60 journaled at their respective front and rear ends thereof, and an endless chain 61 as trained by each sprocket and is connected to the track-engaging element of the roller. The front sprocket 60 is driven by a reversible hydraulic motor 63, and limit switches are provided for reversing operation of the motor. The drive means for the roller are preferrably the same as that disclosed in my copending application Ser. No. 353,699, and the disclosure therein is incorporated by reference with request to the instant application.

It will be seen that the entire compaction mechanism 55 is vertically shiftable in the vehicle body as hay or other forage crops are loaded therein. The vertical openings in the front wall permits vertical shifting movement of the compaction mechanism and means are also provided for guiding the guide structure 57 as it is vertically shifted relative to the vehicle body. In this respect, the vehicle body is provided with a pair of laterally spaced apart elongate vertical guide posts 64 which are located exteriorly of the front wall and which are engaged by vertically disposed tubular guide elements 65, affixed to the transverse member 67.

In the embodiment shown, the clearance between each tubular guide element 65 and its associated vertical guide posts 64 is sufficient to permit a small amount of lateral tilting of the roller 56 about its longitudinal axis to accommodate slight unevenness of the crop surface. Means are also provided for maintaining the guide structure 57 in a level condition in a front and rear direction as the compaction mechanism 55 is shifted vertically during a stack forming operation. This means includes a pair of elongate flexible cables 66, each being connected at one end thereof to one end of a pair of vertically disposed elongate springs 67. It will be noted that these springs 67 are laterally spaced apart and each is secured at its lower end to the lower transverse frame member 15b of the front wall 15. Each cable 66 is then trained about one of a pair of pulleys 68, which are mounted on the upper tranverse member 15a of transverse front wall 15. Each cable 66 then extends rearwardly and is trained about one of a pair of pulleys 69 revolvably mounted on the rear upper transverse member, and each cable 66 then extends downwardly and is secured to the rear end of one of the channel tracks 58.

The leveling mechanism also includes a second pair of cables 70, each being secured at one end thereof to one of the springs 70, and each extending upwardly to be trained about one of a pair of pulleys 71, also mounted on the upper transverse member 15a. Each cable 70 then extends downwardly and is secured to the transverse member 59. It will therefore be seen that with this arrangement, as the compaction mechanism is elevated, upward vertical movement of the U-shaped structure is yieldably resisted by the spring 65 while the cable mechanism maintains the entire U-shaped structure in a level condition, not withstanding the length dimension of the compaction mechanism. Although springs have been used to normally urge the compaction mechanism downwardly against the forage crop in the vehicle body, counterbalance weights or other counterbalance means may be used in lieu of said counterbalance springs.

Means are also provided for retaining the compaction mechanism in an elevated condition when it is desirable to unload the formed stack from the stack wagon. This means includes an elongate cable 72 which is secured at one end thereof to the transverse member 59 adjacent the mid portion thereof. The cable 72 then extends upwardly and is trained about a pulley 73 mounted on the upper transverse member 15a, and then extends downwardly and is wound about the reel or drum of a winch brake 74. The winch brake 74 is a conventional power-driven winch and at the completion of the stack-forming operation, the compaction mechanism may then be elevated slightly to provide a clearance above the formed stack and retained in its elevated position to thereby permit the formed stack to be unloaded from the vehicle body. After the stack is unloaded, the compaction mechanism may then be lowered into position for the next stack forming operation.

During operation of the stack-forming vehicle 10, the vehicle will be connected to either a forage harvesting machine or may be connected to a conventional crop pickup device which impels the windrowed crop rearwardly into the vehicle body. The forage harvesting machine 11 (or pickup device) is provided with a spout or conduit through which the chopped forage crop is impelled, and the chopped forage crop will be continuously directed into the distributor mechanism 31. The use of a flexible tubular coupling 32 permits the towing machine to articulate relative to the stack forming vehicle without interferring with the delivery of the crop to the distributor mechanism. The distributor mechanism will be continuously extended and retracted to thereby cause even distribution of the crop material in a longitudinal direction. The deflector 47 cooperates with the distributor mechanism to assure even distribution of the crop in a lateral direction. The tubular distributor structure 33 serves to closely confine the air entrained stream of crop mateiral until the point of discharge which assures even distribution of the crop in the vehicle body. It is also pointed out that the diverging relation of the distributor veins on the deflector not only insure substantially equal lateral distribution of the crop during the crop forming operation, but these veins are also operable during the terminal stages of the crop forming operation to cause the stack to have a transverse concave configuration to permit water to drain from the surface of the stack when it is exposed to rain.

The compaction mechanism 55 will be reciprocated continuously during the stack forming operation to continuously compact the crop in the vehicle body. At the end of the stack forming operation, the compaction mechanism 55 will be elevated above the surface of the formed stack by the winch brake 74 and the stack will thereafter be removed from the vehicle.

In this respect, the rear door structure 16 will be shifted from the closed position to the open position and the vehicle will be tilted rearwardly and downwardly. The bottom wall 24 will then be moved rearwardly by the hydraulic motor until the bottom wall is extended fully to the rearward position. The rear door structure 16 will then be closed and the bottom wall will be shifted forwardly. Since the formed stack will engage the rear surface of the rear door structures, continued forward movement of the bottom wall will cause the stack to be deposited on the surface of the ground. It is pointed out that the entire vehicle 10 may have to be moved forwardly slightly during the stack removal operation by the towing vehicle. After the stack has been deposited on the surface of the ground, the haystack forming vehicle 10 is then in condition to perform the stack forming operation anew. Although my novel stack forming vehicle 10 is adapted for use in forming stacks from various forage crops, it is especially adapted for use in forming haystacks from chopped hay as distinguished from loose hay. It has been found that stacks formed from chopped hay through the use of my novel stack forming vehicle, are not only of extremely stable construction, but the chopped hay may be fed to cattle without requiring grinding or cutting as is the case with loose hay. It has also been found that chopped haystacks formed with my novel vehicle are easier to handle with conventional farm equipment such as skid steer loaders, rather than stacks or bales formed of loose hay.

Another important advantage of my novel stack forming vehicle is that it can be knocked down into a structure of relatively small bulk and can therefore be more easily transported and commercially shipped than any heretofore known comparable stack wagon.

Thus it will be seen that I have provided a novel stack forming vehicle, which is not only of simple and inexpensive construction, but one which functions in a more efficient manner than any heretofore known comparable vehicles.

I claim:

1. A stack forming vehicle adapted to be towed by a prime mover and adapted to receive a chopped forage crop from a crop harvesting or crop pickup device of the type having a discharge spout through which the chopped forage crop is discharged, comprising:

a generally rectangular shaped vehicle body including a bottom wall, a front wall, upstanding substantially opposed vertical side walls, a closure structure shiftably mounted on said vehicle body adjacent the rear end thereof and being swingable between a closed position for closing the rear end of the vehicle body, and an open position to permit a formed stack to be removed rearwardly from the vehicle body, ground engaging wheels, means connecting the ground engaging wheels with said vehicle body to permit travel thereof over the surface of the ground, an elongate revolvable compacting roller extending transversely of said vehicle body and having a length dimension slightly less than the interior width dimension of the vehicle body, said compacting roller being reciprocable in a front and rear direction in the vehicle body along the surface of the forage crop during loading of the vehicle body to continuously compact the forage crop therein, an elongate guide structure engaged by said compacting roller and guiding the latter during its reciprocating movement, drive means operatively connected with said compacting roller and being operable for reciprocating the latter, a shiftable distributor mechanism in the vehicle body and adapted to be connected to the discharge spout of the crop harvesting device and being shiftable in a front and rear direction, said distributor being operable when shifted to evenly distribute the chopped forage crop into the vehicle body.

2. The stack forming vehicle as defined in claim 1 wherein said guide structure comprises a pair of elongate laterally spaced apart substantially parallel guide tracks, means rigidly interconnecting said tracks, said compacting roller and guide structure being elevated by the crop as the crop fills the vehicle body, means connected with said guide structure for retaining the guide structure and roller in an elevated position as the crop is discharged from the vehicle body.

3. The stack forming vehicle as defined in claim 1 wherein said distributor mechanism is of tubular construction and is extensible and retractable in a front and rear direction, said tubular distributor mechanism having an outlet adjacent its rear end into which the chopped forage crop is discharged during extension and retraction of the distributor mechanism, and means for extending and retracting said distributor mechanism.

4. The stack forming vehicle as defined in claim 2 wherein said distributor mechanism is comprised of a plurality of interconnected telescoping tubular sections, and said means for extending and retracting said distributor mechanism is operatively connected with said sections to extend said sections, longitudinally of the vehicle body, whereby said outlet is continuously moved in a front and rear direction between the rear end of said vehicle body and the front end thereof.

5. The stack forming vehicle as defined in claim 3 and a deflector mounted on said distributor mechanism adjacent the rear end thereof, said deflector presenting a concave deflector surface for deflecting the chopped forage crop discharged from the tubular distributor mechanism downwardly, and means on said concave deflector surface defining distributor veins for evenly distributing the crop in a transverse direction with respect to the vehicle body.

6. The stack forming vehicle as defined in claim 1 wherein said bottom wall is shiftable between forward and rearward positions, said bottom wall when in the forward position defining the floor of the vehicle body for supporting the chopped crop thereon, and when in the rearward position being disposed rearwardly of the vehicle body, whereby when said closure structure is closed when the bottom is in the rearward position and the bottom wall is them shifted forwardly, the crop stack will be positioned upon the ground, and means for shifting the bottom wall in forward and rearward directions.

7. The stack forming vehicle as defined in claim 2 and means operatively connected with said guide structure for maintaining the guide structure in a substantially level condition as the guide structure and compacting roller are elevated by the crop during the stack-forming operation.

* * * * *